(12) United States Patent
Toulmay

(10) Patent No.: US 6,530,542 B2
(45) Date of Patent: Mar. 11, 2003

(54) ROTARY WING AIRCRAFT WITH ELECTRIC PITCH CONTROL

(75) Inventor: François Toulmay, Vitrolles (FR)

(73) Assignee: Eurocopter, Marignane Cedes (FR)

( * ) Notice: Subject to any disclaimer, the term of this patent is extended or adjusted under 35 U.S.C. 154(b) by 0 days.

(21) Appl. No.: 09/901,901

(22) Filed: Jul. 11, 2001

(65) Prior Publication Data

US 2002/0005456 A1 Jan. 17, 2002

(30) Foreign Application Priority Data

Jul. 13, 2000 (FR) .............................................. 00 09203

(51) Int. Cl.[7] .............................................. B64C 27/54
(52) U.S. Cl. ...................................... 244/17.13; 416/24
(58) Field of Search .......................... 244/17.11, 17.25, 244/17.13; 416/23, 24, 31, 500

(56) References Cited

U.S. PATENT DOCUMENTS

| 5,242,130 A | * | 9/1993 | Mouille et al. | .......... 244/17.13 |
|---|---|---|---|---|
| 5,387,083 A | | 2/1995 | Larson et al. | |
| 5,409,183 A | | 4/1995 | Gunsallus | |
| 5,626,312 A | | 5/1997 | Head | |
| 5,711,651 A | * | 1/1998 | Charles et al. | .......... 244/17.13 |
| 6,059,225 A | | 5/2000 | Vidal et al. | |

FOREIGN PATENT DOCUMENTS

EP          0947422          6/1999

* cited by examiner

*Primary Examiner*—Galen L. Barefoot
(74) *Attorney, Agent, or Firm*—Stevens, Davis, Miller & Mosher, LLP

(57) ABSTRACT

Rotary wing aircraft with electric pitch control.

According to the invention, each blade (5.$i$) of the wing comprises a plurality of flaps (6.$i$) which are able to control the pitch of said blade and are aligned along the span of the latter, said flaps being individually controlled in orientation from a flight control device (17).

Elimination of mechanical and hydromechanical members for controlling the rotor of such an aircraft, without loss of reliability.

12 Claims, 3 Drawing Sheets

ROTARY WING AIRCRAFT WITH ELECTRIC PITCH CONTROL

The present invention relates to a rotary wing aircraft, for example of the helicopter type, in which a rotor, fitted with blades and constituting said rotary wing, is pitch-controlled entirely electrically.

It is known that standard helicopters comprise numerous mechanical and hydromechanical members required for the control of the collective pitch and of the cyclic pitch of the blades of their rotor. Such members are expensive and moreover exhibit considerable mass.

There have already been attempts to reduce the mass and the cost of such a helicopter (see for example patents U.S. Pat. No. 5,387,083, U.S. 5,409,183 and U.S. 5,626,312) by providing electric flight controls which operate the deflection of flaps, each of them being mounted on one of said blades of the rotor and being able to aerodynamically control the pitch of the associated blade, thus making it possible to do away with a few mechanical and hydromechanical members such as jacks, pumps and hydraulic circuits, but none of the other mechanical members.

Furthermore, in these known embodiments of helicopters with electric controls and pitch-control flaps, instability problems arise which are such that the standard aeronautic safety criteria may not be satisfied with regard to elementary or combined breakdowns which are not highly improbable.

The object of the present invention is to remedy these drawbacks. It relates to an aircraft in which the changes of pitch of the blades are obtained with the aid of such flaps, which is enhanced in such a way as to make it possible to do away with almost all the mechanical and hydromechanical members for controlling the pitch of the rotor, while ensuring perfect safety of use.

To this end, according to the invention, the aircraft comprises:

- a fuselage;
- control members available to a pilot, which are disposed in said fuselage and are able to produce flying instructions;
- at least one rotor revolving with respect to said fuselage and catering for the functions of uplift of said aircraft and of displacement of the latter according to roll and pitching axes as well as in vertical and horizontal translation, said rotor comprising at least two blades whose pitch can be controlled so as to allow said rotor to cater for said functions;
- orientable flaps carried by said blades so as to control their pitch, each of said blades comprising a plurality of flaps aligned along the span of said blade and each blade comprising as many flaps, arranged identically, as any one of the other blades;
- electric actuation devices carried by said blades so as to actuate said orientable flaps with a view to the control of the pitch of said blades;
- a flight control device disposed in said fuselage and producing, from said flying instructions and from signals representative of flight parameters, a plurality of control commands for the plurality of said electric actuation devices;
- a plurality of links provided between said flight control device and each of said electric actuation devices so as to address to each of these electric devices, through said interface, one of said control commands; and
- a stationary/rotary interface between said fuselage and said rotor allowing said plurality of links to transmit said control commands to said electric actuators, the aircraft in which:
- said flight control devices comprises as many distinct control paths as there are flaps on each blade;
- said interface comprises as many distinct transmission paths as there are distinct control paths;
- said distinct control paths of said flight control device are respectively associated with said distinct transmission paths of said interface so as to form, with said links, as many distinct control channels as there are flaps on each blade; and
- each of said control channels produces and conveys the control commands for all the electric actuation devices of the flaps of the same rank on said blades.

Thus, by virtue of the plurality of flaps mounted on each of said blades and of the plurality of control commands addressed, electrically and/or optically, to the electric actuation devices of said flaps, it is possible to effect all of the pitchwise controls of the rotor of said aircraft electrically. It is therefore possible to do away with all the mechanical and hydromechanical members used as standard for this purpose, namely the pitch levers, the control linkages, the sliding and rotating swashplates, the pumps and hydraulic circuits, the jacks, the control rods and levers and the combiner.

This results in a considerable lightening and appreciable simplification of the mechanical assemblies specific to a rotary wing aircraft and in particular to a helicopter. Moreover, such a rotor control system is easily transposable and reconfigurable from one type of aircraft to another, the gist of the modifications then consisting in a new setting of the various parameters with a limited impact on the hardware devices.

Moreover, in the aircraft according to the present invention, the multiplicity of links between the flight control device and the flaps of the blades makes it possible to obtain a multiplicity of independent control channels, having no common member.

Thus, in the event of breakdown of hardware or software elements, the aircraft according to the invention can continue to be flown in complete safety, although possibly with reduced performance. Flight safety is therefore ensured.

The flight control device can be of the type described in American patent U.S. Pat. No. 6,059,225.

To further increase reliability and safety, said control channels may be embodied according to different technologies. It is then advantageous for the control channels of flaps close to the free ends of said blades—these being the flaps which exhibit the greatest aerodynamic effectiveness—to be embodied according to the technology regarded as the most reliable.

Preferably, each electric actuation device is housed in the corresponding blade, in immediate proximity to the flap with which it is associated. Thus, the mechanical link between an electric actuation device and its flap can be short, so that the control of said flap is immediate and direct and that long control rods routed through the blade can be avoided.

For additional reasons of safety, each electric actuation device comprises at least two electric actuators—jack or motor—mounted in parallel.

The flaps for controlling the pitch of the blades could be mounted, on the latter, on their leading edge side. However, for reasons of stability it is preferable for said flaps to be arranged in the trailing edge of said blades.

Moreover, in order to cope with any failure of a control channel through a defect in one of its elements specific to a single blade, which would run the risk of a considerable imbalance of the forces exerted on the rotor, there is provided an autosurveillance system permanently verifying, for each control channel, the conformity of the implementation of the deflections of the flaps of the channel with regard to the control commands. In the event of nonconformity of implementation, all the flaps of the channel are mechanically immobilized. The positional holding of the flaps which is necessary to prevent any aerodynamic or aeroelastic flutter phenomenon, must be effective whatever failure is at issue, including cases of loss of electrical power for the relevant channel.

Furthermore, by virtue of the fact that, in the rotary wing aircraft according to the invention, all the pitch control commands are electrical or optical, auxiliary signals can easily be appended to said commands so as to implement additional functions, such as, as will be described hereinafter, an antiresonance function, a wing autoadjustment function, or else antivibratory and antinoise functions.

The figures of the appended drawing will elucidate the manner in which the invention may be embodied. In these figures, identical references designate similar elements.

Figure 1:
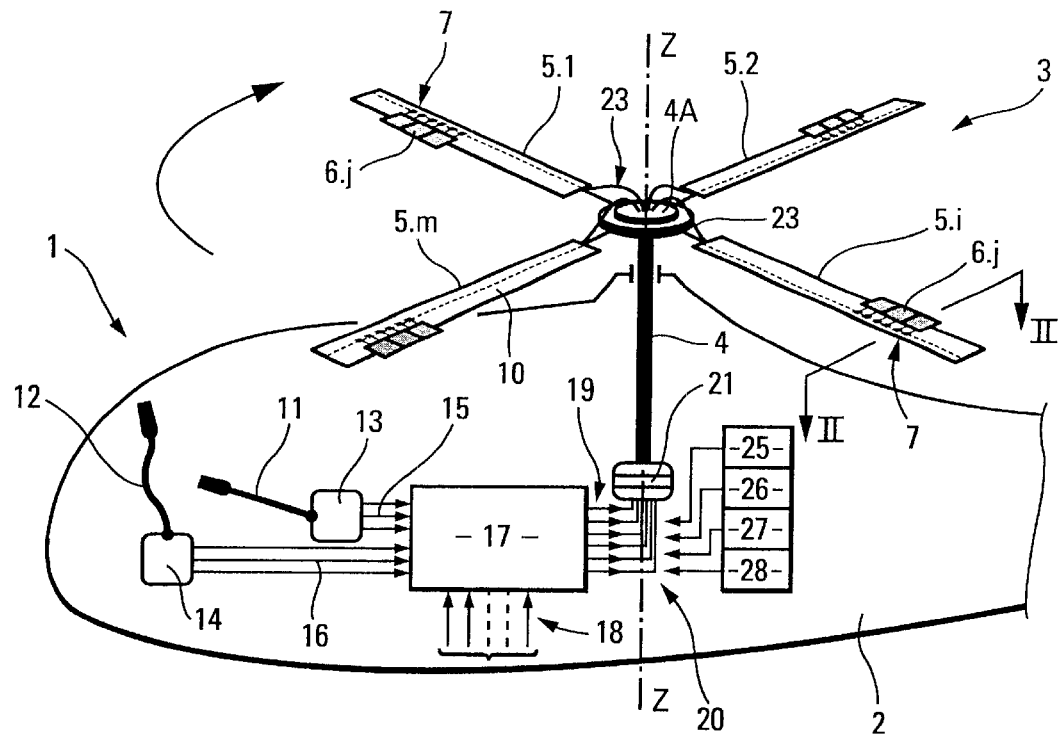
FIG. 1 is a schematic and partial general view of a helicopter provided with flight controls in accordance with the present invention.
Figure 2:
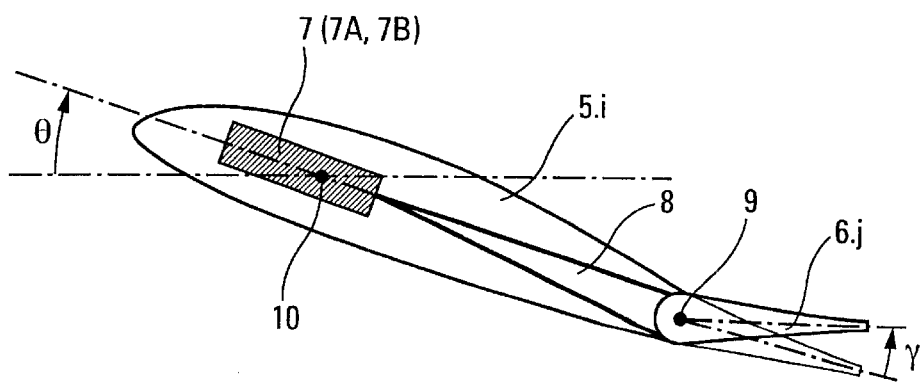
FIG. 2 is a section along the line II—II of FIG. 1, schematically illustrating the disposition of the pitch control flaps and of their actuators, on the blades of the rotor of the helicopter.

The helicopter 1, schematically illustrated in FIG. 1, comprises a fuselage 2 with respect to which can rotate a rotor 3 (the helicopter could comprise several rotors 3), carried at the upper end of a rotary vertical shaft 4, of axis Z—Z, by way of a hub 4A. In this FIG. 1, the system for rotating the rotor 3 and for rotating the shaft 4 is not represented.

The fuselage is represented magnified with respect to the rotor so as to show the various devices which it contains.

To the hub 4A are attached a plurality m of blades 5.1, 5.2, ... 5.$i$, ... 5.$m$ (with i=2.3, ..., m) regularly distributed around the axis Z—Z of the shaft 4 so as to form said rotor 3, and each blade 5.$i$ comprises a plurality p of trailing edge flaps 6.1, 6.2, ... 6.$j$, ... 6.$p$ (with j=2, 3, ..., p) aligned along the span of said blade. In the particular example of FIG. 1, m is equal to 4 and p is equal to 3. On all the blades 5.$i$, the number p of flaps 6.$j$ is identical and, from one blade to another, the arrangement of said flaps is also identical.

With each of the trailing edge flaps 6.$j$ of each of the blades 5.$i$ is associated an electrical actuation device 7, composed of two electric actuators 7A and 7B, in parallel. All the electric actuation devices 7 are housed inside said blades 5.$i$, each device 7 being in proximity to the flap 6.$j$ which is associated therewith and connected to the latter by a short and direct mechanical link 8. Thus, each device 7 can cause the associated flap 6.$j$ to pivot rapidly about its axis 9 (of general direction parallel to the span of the corresponding blade), by way of the mechanical link 8. Such pivoting can be performed equally in either direction.

Thus, in a known manner, such flaps make it possible to modify the aerodynamic pitching moment of the blades which carry them, about the change of pitch axis 10 of said blades. The deflection γ of a flap 6.$j$ about its axis 9 makes it possible to modify the pitch θ of the corresponding blade 5.$i$.

Provided inside the fuselage 2 are a collective pitch lever 11 and a cyclic pitch lever 12, available to a pilot (not represented). With these levers 11 and 12 are respectively associated sensors 13 and 14, which convert the displacements of said levers into electrical or optical flying instructions, which are addressed, respectively via links 15 and 16, to an electric flight control device 17. The latter moreover receives, via links 18, flight parameters delivered by sensors, accelerometers, gyrometers, etc. (not represented).

Figure 3:
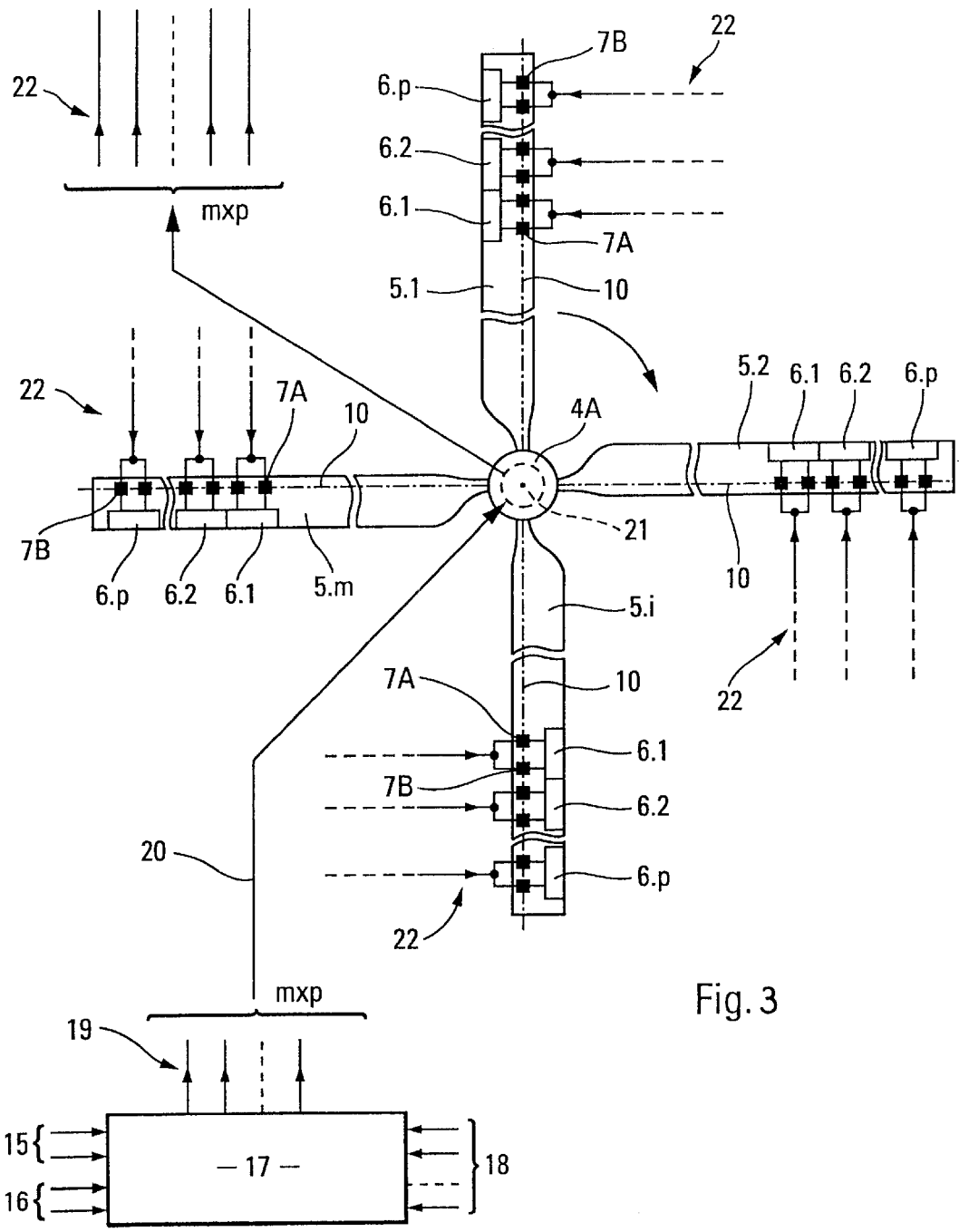
FIG. 3 is a schematic diagram of the flight control system of FIG. 1.

On the basis of said flying instructions and of said flight parameters (see also FIG. 3), the electric flight control device 17 formulates a plurality m×p of control commands, appearing on the outputs 19 of said device 17 and each intended for one of the p flaps 6.$j$ of one of the m blades 5.$i$.

Via multiple links 20, the plurality of the m×p control commands formulated by the device 17 are addressed to a set of rotating collectors forming a stationary/rotary interface 21, which pass these commands unaltered from the nonrotating fuselage 2 to the rotor 3. These commands are routed to each of the actuation devices 7 of the flaps 6.$j$, via m×p links 22 (see FIG. 3), the links 22 corresponding to one and the same blade 5.$i$ possibly being gathered together in a cable 23 (see FIG. 1).

Figure 4:
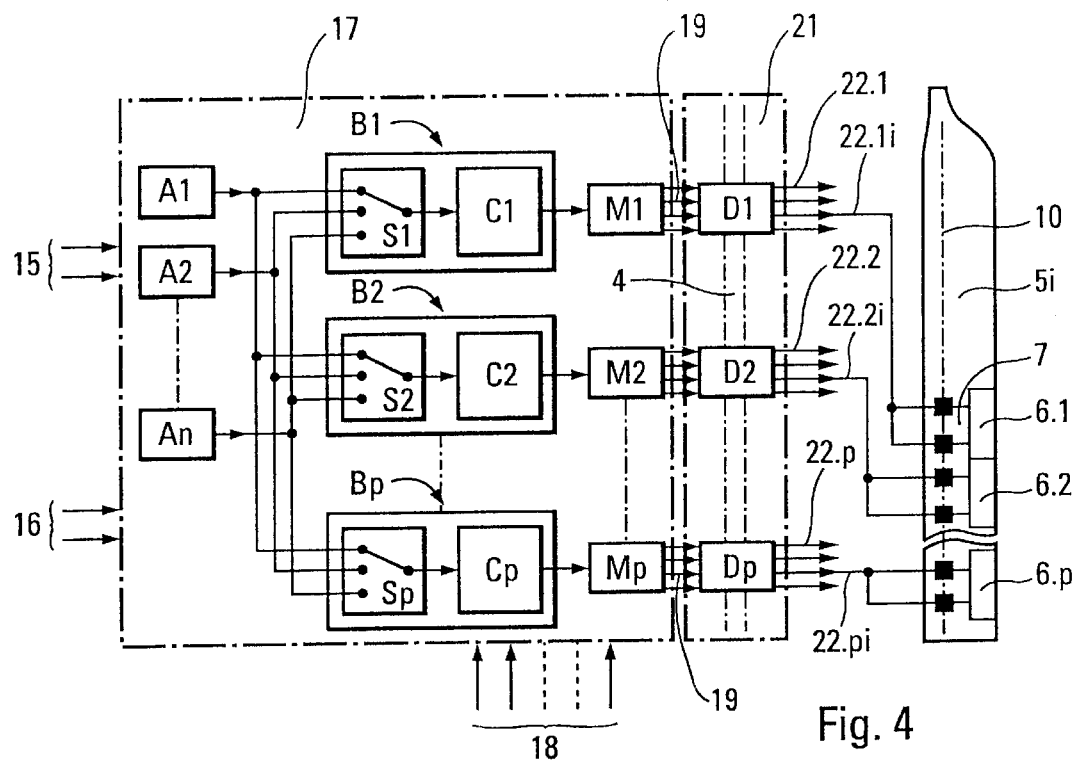
FIGS. 4 and 5 illustrate two embodiments of the flight control device producing the control commands for deflecting said flaps.

Represented in FIG. 4 is an exemplary embodiment of the electric flight control device 17, in accordance with that of patent U.S. Pat. No. 6,059,225. This exemplary embodiment comprises:

a plurality of n channels for generating commands A1, A2, ... An, which generate, from the signals received via the links 15, 16, 18 a set of n first flying commands;

a plurality of p servocontrol channels B1, B2, ..., Bp, each selecting one of the channels for generating commands A1 to An by means of a respective selector S1 to Sp and formulating second flying commands by means of a respective calculator C1 to Cp; and a plurality of p demultiplexers M1, M2, ..., Mj, ... Mp, wherein each demultiplexer Mj formulates, on the basis of said second commands, control commands for the flap 6.$j$ of each blade 5.$i$.

Thus, the set of outputs of said demultiplexers Mj form the outputs 19 of the device 17.

These outputs 19 are respectively connected to a plurality p of rotating collectors D1, D2, ... Dj, ... Dp forming the interface 21 for transmitting said control commands, via the links 22, to said flaps 6.$j$ of the blades 5.$i$.

With such an electric flight control device 17, the links 22 form p groups 22.1, 22.2, ..., 22.$p$, each of which is intended for the control of all the flaps 6.$j$ of corresponding index: group 22.1 controls flap 6.1 of each of the m blades 5.1 to 5.$m$, group 22.2 controls flap 6.2 of each of the blades 5.1 to 5.$m$, etc.

Thus:

flap 6.1 of blade 5.$i$ is controlled by the specific link 22.1$i$ of group 22.1;

flap 6.2 of blade 5.$i$ is controlled by the specific link 22.2$i$ of group 22.2; etc., and flap 6.$p$ of blade 5.$i$ is controlled by the specific link 22.$pi$ of group 22.$p$.

The links 22 between the interface 21 and the devices 7 for actuating the flaps 6.$j$ are carefully protected mechanically and electrically in the shaft 4 and the hub 4A and inside the blades 5.$i$. They follow well separated routes therein and may deploy various technologies. All these precautions are taken so that localized mechanical damage or else an electromagnetic disturbance arising on account of an external cause can not in any circumstance render them all inoperative simultaneously, and that a capability to fly the helicopter 1 which is sufficient to continue the flight in safety is thus preserved in all cases.

It may be seen that, according to these dispositions, each control channel consisting of a servocontrol channel Bj, a rotating collector Dj, a demultiplexer Mj, the motors 7 of the set of flaps 6.j, as well as all the links 22 between these elements, constitutes a functional assembly which is completely independent of the other channels without any other commonality apart from the vital primary structures which support them such as the fuselage, the shaft 4, the hub 4A and the blades.

With the aim of further reducing the probability of a common mode of failure, such as for example may result from an insufficiency of a piece of software, the various channels preferably use different technologies. The channel whose technology is regarded as the most reliable overall is preferentially assigned to the control of the flaps having the greatest aerodynamic effectiveness, that is to say as a general rule, those situated as near as possible to the end of the blade and carrying the reference 6.p in the drawings.

Moreover, in order to cope with any failure of any channel through a defect in one of its elements specific to a single blade, which would run the risk of a considerable imbalance of the forces exerted on the rotor, each channel comprises an autosurveillance system 25 permanently verifying the conformity of the implementation of the deflections of the flaps of the channel with regard to the second commands. In the event of nonconformity of implementation, all the flaps of the channel are mechanically immobilized. The positional holding of the flaps which is necessary to prevent any aerodynamic or aeroelastic flutter phenomenon, must be effective whatever failure is at issue, including cases of loss of electrical power for the relevant channel.

Figure 5:
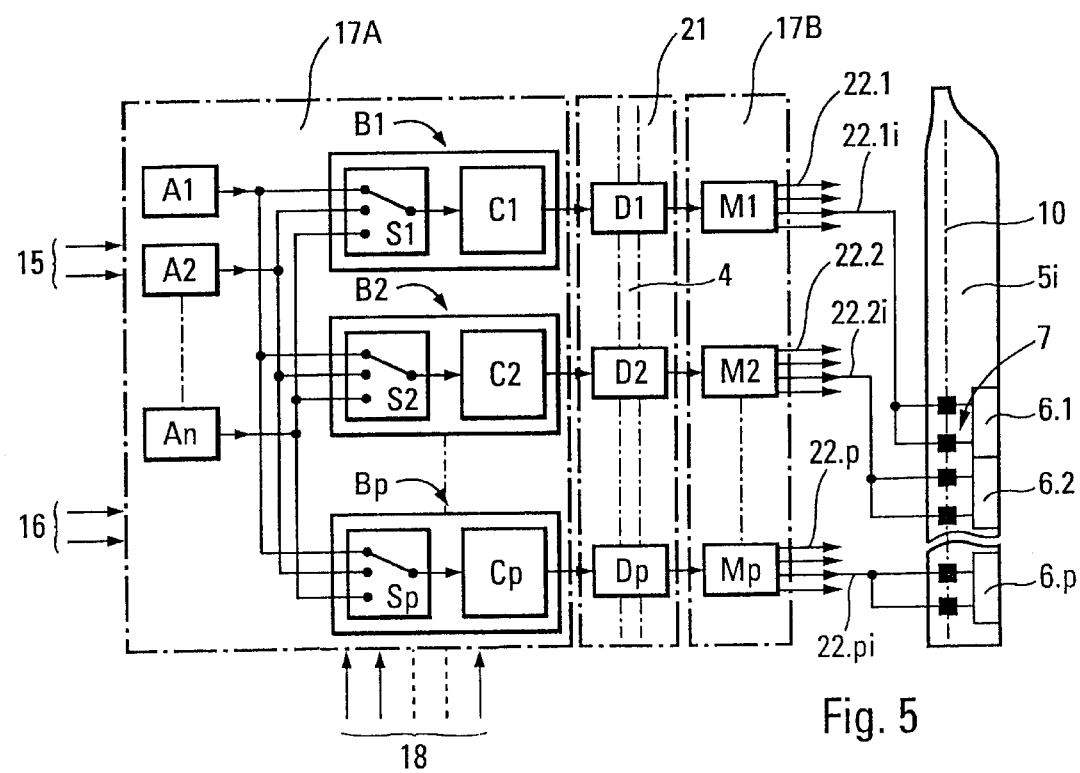

The variant embodiment represented in FIG. 5 differs from the embodiment of FIG. 4 in that the collectors D1, D2, . . . Dj, . . . Dp are interposed between the servocontrol channels B1, B2, . . . Bj, . . . Bp and the demultiplexers M1, M2, . . . Mj, . . . Mp, the device 17 then being split into two parts 17A and 17B, separated by the interface 21. In this case, said demultiplexers can be housed in the hub 4A of the rotor 3.

The embodiments of FIGS. 4 and 5 are functionally equivalent. Advantage may be found in adopting one or other of these embodiments as a function of the technologies employed in the relevant channel. In particular, it is possible to choose one or other of these embodiments for the various flying channels.

Moreover, the present invention allows functions other than those of uplift and propulsion to be easily catered for by the rotor 3 without introducing an additional mechanical member, and even while doing away with or simplifying the mechanical members currently indispensable for this purpose on known helicopters.

Examples of such additional functions are given hereinafter.

It is known that the rotors of helicopters, of large diameter and comprising blades of slender shape, are subject, on the ground, to oscillations of the center of gravity of the blades in a plane parallel to their plane of rotation. This mode of oscillation is liable to be coupled with the movements of the fuselage on its landing gear while the rotor is revving up, with a high risk of divergence of these coupled oscillations, possibly resulting in the ground looping and destruction of the craft. This is the so-called "ground resonance" phenomenon. A similar coupling, divergent or self-sustained, may also arise in flight when the rotor produces a strong thrust through interaction of the rotor with a roll eigenmode of the craft; this is the so-called "air resonance" phenomenon.

The solution generally adopted for eliminating the problems of resonance consists in equipping the hub with the same number of mechanical devices, known as adapters (stiffness effects) or drag absorbers (absorption effect), as blades.

On the other hand, to solve this problem of resonance in the aircraft of the present invention, it is sufficient to provide a device 26, associated with accelerometers (not represented), which is able to supplement the control commands, in at least some of the control channels, with a signal consisting of small oscillatory components at the natural frequency of resonance of the rotor (frequency seen by a fixed observer, always less than half the frequency of rotation of the rotor) with maximum amplitude of the order of 1 degree of pitch angle. These components are proportional to the accelerations measured, at this same frequency, by two of said accelerometers placed at a fixed part on the gearbox supporting the rotor and along two directions orthogonal to the axis of the rotor and orthogonal to one another. The components injected into the control commands are phase-shifted in such a way as to create a feedback action absorbing the natural oscillations of the rotor.

As compared with the basic control system described hereinabove, it is necessary to append, for each servocontrol channel thus processed, two accelerometers as well as a cyclic phase-shifter filter with two inputs and two outputs, which can be embodied in analog fashion. If the servocontrol channel uses digital technology, the filtering/phase-shifting functions could be implemented in whole or part by virtue of appropriate software.

If one wishes to do away with the mechanical absorbing devices completely, the antiresonance function takes on a critical character; it is then necessary to intervene on each of the servocontrol channels independently. Without a specific device, this function benefits from the autosurveillance of the implementation of the commands which is built into the basic system (device 25) as well as from the automatic disabling of the channel in the event of nonconformity. In the event of a breakdown of a channel in the part formulating the antiresonance commands, the other channels which each have authority equal to that which has failed, suffice to compensate for this failure.

As a variant, one may choose to deploy the antiresonance function only on certain control channels, without redundancy but with autosurveillance and automatic disabling; simplified and lightweight mechanical adapters (not represented) are then necessary in order to cope with any breakdowns, associated with landing precaution procedures and with a limitation of the maneuvering domain.

Moreover, it is known that the manufacturing tolerances mean that the blades, even when new and adjusted by the manufacturer, are never strictly identical. When the rotor turns, slight differences in the distribution of mass and in the shape of the surface create imbalances, respectively in the inertial forces and in the aerodynamic forces. These imbalances are sources of vibration, in particular perceptible at the frequency of rotation of the rotor (out-of-balance effect), and usually necessitate rotor adjustment operations by addition or displacement of supplementary masses and deflections of small aerodynamic surfaces, known as tabs. These operations must be repeated regularly following minor alterations to the blades (impacts, wearing of the leading edges, absorption of humidity, etc.), which never affect the blades identically.

In the aircraft in accordance with the present invention, it is easy to provide a device 27, associated with at least one accelerometer (not represented) so as to perform fine-tuning operations making it possible to automatically and permanently compensate for the misbalance between blades, and thus to avoid—or at least to space out—the manual adjustment operations, while catering for continuous detection of the appearance of out-of-spec defects and surveillance of their progress.

If the rotor controls system is already equipped with the antiresonance device 26, it is possible, for the device 27, to use one of the two accelerometers of the latter for the autoadjustment function; otherwise, said device 27 should comprise at least one specific accelerometer, installed according to the same dispositions and preferably oriented in the direction where the response of the fixed structure to the out-of-balance of the rotor proves to be most sensitive (longitudinal or else lateral direction). The information provided by this accelerometer is analyzed and converted into correction signals which are appended to the control commands of at least one of the control channels. The effect of these signals is to slightly shift the mean position of the relevant flaps. These signals must always remain of low amplitude and their authority must be limited by a very reliable process. The noncritical character of the autoadjustment function makes it possible to equip just a restricted number of control channels, for example just one. In the event of failure, the function can be deactivated automatically or manually by the pilot.

The overstepping of predefined correction thresholds can be recorded and constitute a useful item of information for the maintenance of the craft by thus revealing the appearance or the progress of defects in a given blade.

It is known moreover that the control of a rotor ensuring the uplift of a rotary wing aircraft requires that the pitch of the blades be made to vary according to a cyclic and sinusoidal law as a function of the angle of azimuth described by each of the blades: mean static value, with first harmonic of the angle of azimuth. It is also known that the vibrations created by the rotor and perceived in the cabin of the aircraft can be reduced to a very great extent by varying the pitch of the blades according to cyclic laws comprising certain harmonics of this angle.

Likewise, it is known that the noise emitted by the rotor and perceived on the ground can be very effectively reduced by deploying similar multicyclic laws extending at least up to rank 4. This reduction in noise is especially effective and noticeable in the manifestly noisy conditions which come together when the helicopter approaches its landing area, following a certain descent slope of around 6 degrees at moderate speed (case where the blades interact aerodynamically with the vortices which they have themselves shed).

It will easily be understood that, in the aircraft according to the present invention, it is possible to provide a device 28 able to control the flaps 6.j of the blades 5.i so as to enable the aerodynamic lift to be varied rapidly and directly, with an effect which is localized but nevertheless considerable and with a small delay. Indeed, the response of the blade in its pitchwise rotational movement decreases rapidly beyond the first harmonic and right from the second harmonic. For the higher harmonics, the direct response of the lift to the deflection of the flaps therefore plays a dominant role, although this does not require the very considerable energy which would be needed to pivot the complete blade.

For the deployment of multicyclic laws, the device 28 must formulate deflection commands common to the whole rotor, which are derived from the multicyclic deflection law and are appended to the commands for controlling the pitch of at least certain flaps 6.j.

For the reduction of vibrations, the device 28 associated with accelerometers (not represented) calculates said deflection commands by minimizing certain criteria calculated by weighting vibration measurements performed by said accelerometers distributed at several points of the cabin and along several directions. Several minimization algorithms, of the autoadaptive type, may be used.

As regards the noise reduction, the device 28 formulates multicyclic commands on the basis of preestablished laws which vary as a function of the general flight parameters, namely: the reduced mass, the anemometric speed, the command for the general deflection of the flaps and the power of the engines.

When the antinoise and antivibratory functions are deployed simultaneously, the multicyclic commands are obtained by summing the commands formulated for each function considered separately.

The multicyclic commands being established and introduced into at least some control channels, the demultiplexer Mj of the relevant channel formulates the individual commands for each of the blades.

The antivibratory function of the device 28 requires only limited deflection amplitudes, of the order of 2 degrees. In the event of poor operation, it affects comfort, but does not place the craft in peril. This function may therefore affect only certain control channels and not all of them. In the event of failure, the function can be deactivated automatically or manually by the pilot.

The antinoise function of the device 28 requires, in order to be completely effective, fairly considerable deflection amplitudes, of the order of 5 to 10 degrees. Any poor operation thereof would affect the safety of the flight, with a risk of rapid damage to the mechanical assemblies. In order to cope with such a failure which could be caused by one of the elements specific to a single blade, the autosurveillance function of the device 25, which permanently verifies the conformity of the implementation of the deflection of the flaps for primary control, will be extended so as also to cater for the surveillance of the conformity of implementation of the multicyclic commands. In the event of nonconformity of implementation, this one antinoise function will be disabled automatically. The antinoise function not being indispensable to the continuance of the flight, a restricted number of control channels may be so equipped, for example just one.

What is claimed is:

1. An aircraft comprising:
   a fuselage;
   control members available to a pilot, which are disposed in said fuselage and are able to produce flying instructions;
   at least one rotor revolving with respect to said fuselage and catering for the functions of uplift of said aircraft and of displacement of the latter according to roll and pitching axes as well as in vertical and horizontal translation, said rotor comprising at least two blades whose pitch can be controlled so as to allow said rotor to cater for said functions;
   orientable flaps carried by said blades so as to control their pitch, each of said blades comprising a plurality of flaps aligned along the span of said blade and each blade comprising as many flaps, arranged identically, as any one of the other blades;
   electric actuation devices carried by said blades so as to actuate said orientable flaps with a view to the control of the pitch of said blades;

a flight control device disposed in said fuselage and producing, from said flying instructions and from signals representative of flight parameters, a plurality of control commands for the plurality of said electric actuation devices;

a plurality of links provided between said flight control device and each of said electric actuation devices so as to address to each of these electric devices, through said interface, one of said control commands; and a stationary/rotary interface between said fuselage and said rotor allowing said plurality of links to transmit said control commands to said electric actuators, the aircraft in which:

said flight control devices comprises as many distinct control paths as there are flaps on each blade;

said interface comprises as many distinct transmission paths as there are distinct control paths;

said distinct control paths of said flight control device are respectively associated with said distinct transmission paths of said interface so as to form, with said links, as many distinct control channels as there are flaps on each blade; and each of said control channels produces and conveys the control commands for all the electric actuation devices of the flaps of the same rank on said blades.

2. The aircraft as claimed in claim 1, wherein one of the distinct control channels is of a first type and another of the distinct control channels is of a second type which is different from the first type.

3. The aircraft as claimed in claim 1, comprising a device which, on the basis of accelerometric information, produces signals which it appends to said control commands addressed to at least some of said flaps so as to automatically minimize, with the aid of the latter, the vibrations produced by said rotor.

4. The aircraft as claimed in claim 1, in which each electric actuation device is housed in the corresponding blade, in immediate proximity to the flap with which it is associated.

5. The aircraft as claimed in claim 1, in which each electric actuation device comprises at least two actuators mounted in parallel.

6. The aircraft as claimed in claim 1, in which said flaps are arranged in the trailing edge of said blades.

7. The aircraft as claimed in claim 1, comprising a device which produces signals calculated as a function of flight conditions which it appends to said control commands addressed to at least some of said flaps so as to combat, with the aid of the latter, the noise produced by said rotor.

8. The aircraft as claimed in claim 1, comprising a device which, on the basis of accelerometric information, produces signals which it appends to said control commands addressed to at least some of said flaps so as to combat, with the aid of the latter, the phenomenon of ground resonance and air resonance.

9. The aircraft as claimed in claim 1, comprising a device which, on the basis of accelerometric information, produces signals which it appends to said control commands addressed to at least some of said flaps so as to cater, with the aid of the latter, for the autoadjustment of said rotary wing.

10. An aircraft comprising:

a fuselage;

control members available to a pilot, which are disposed in said fuselage and are able to produce flying instructions;

at least one rotor revolving with respect to said fuselage and catering for the functions of uplift of said aircraft and of displacement of the latter according to roll and pitching axes as well as in vertical and horizontal translation, said rotor comprising at least two blades whose pitch can be controlled so as to allow said rotor to cater for said functions;

orientable flaps carried by said blades so as to control their pitch, each of said blades comprising a plurality of flaps aligned along the span of said blade and each blade comprising as many flaps, arranged identically, as any one of the other blades;

electric actuation devices carried by said blades so as to actuate said orientable flaps with a view to the control of the pitch of said blades;

a flight control device disposed in said fuselage and producing, from said flying instructions and from signals representative of flight parameters, a plurality of control commands for the plurality of said electric actuation devices;

a plurality of links provided between said flight control device and each of said electric actuation devices so as to address to each of these electric devices, through said interface, one of said control commands; and a stationary/rotary interface between said fuselage and said rotor allowing said plurality of links to transmit said control commands to said electric actuators, wherein said flight control device comprises as many distinct control paths as there are flaps on each blade, said interface comprises as many distinct transmission paths as there are distinct control paths, said distinct control paths of said flight control device are respectively associated with said distinct transmission paths of said interface so as to form, with said links, as many distinct control channels as there are flaps on each blade, each of said control channels produces and conveys the control commands for all the electric actuation devices of the flaps of the same rank on said blades, one of the distinct control channels is of a first type and another of the distinct control channels is of a second type, which is different from the first type, and the control channels associated with the flaps closest to the free ends of said blades are of the first type and have a higher reliability than the control channels of the second type.

11. An aircraft comprising:

a fuselage;

control members available to a pilot, which are disposed in said fuselage and are able to produce flying instructions;

at least one rotor revolving with respect to said fuselage and catering for the functions of uplift of said aircraft and of displacement of the latter according to roll and pitching axes as well as in vertical and horizontal translation, said rotor comprising at least two blades whose pitch can be controlled so as to allow said rotor to cater for said functions;

orientable flaps carried by said blades so as to control their pitch, each of said blades comprising a plurality of flaps aligned along the span of said blade and each blade comprising as many flaps, arranged identically, as any one of the other blades;

electric actuation devices carried by said blades so as to actuate said orientable flaps with a view to the control of the pitch of said blades;

a flight control device disposed in said fuselage and producing, from said flying instructions and from signals representative of flight parameters, a plurality of control commands for the plurality of said electric actuation devices;

a plurality of links provided between said flight control device and each of said electric actuation devices so as to address to each of these electric devices, through said interface, one of said control commands;

an autosurveillance device that monitors the conformity of the deflection of at least some of said flaps with regard to said control commands addressed to them and provides a surveillance signal indicative of an amount of the conformity to the flight control device; and a stationary/rotary interface between said fuselage and said rotor allowing said plurality of links to transmit said control commands to said electric actuators, wherein said flight control device comprises as many distinct control paths as there are flaps on each blade, said interface comprises as many distinct transmission paths as there are distinct control paths, said distinct control paths of said flight control device are respectively associated with said distinct transmission paths of said interface so as to form, with said links, as many distinct control channels as there are flaps on each blade, and each of said control channels produces and conveys the control commands for all the electric actuation devices of the flaps of the same rank on said blades.

12. The aircraft of claim 11, wherein, in response to the surveillance signal, the flight control device produces the plurality of control commands to immobilize one or more of the plurality of flaps on each blade when the flight control device identifies a conformity fault.

* * * * *